Sept. 8, 1964   N. W. BELL ETAL   3,148,339
NEGATIVE FEEDBACK AMPLIFIER FOR BRIDGE-TYPE TRANSDUCERS
Filed April 7, 1961   2 Sheets-Sheet 1
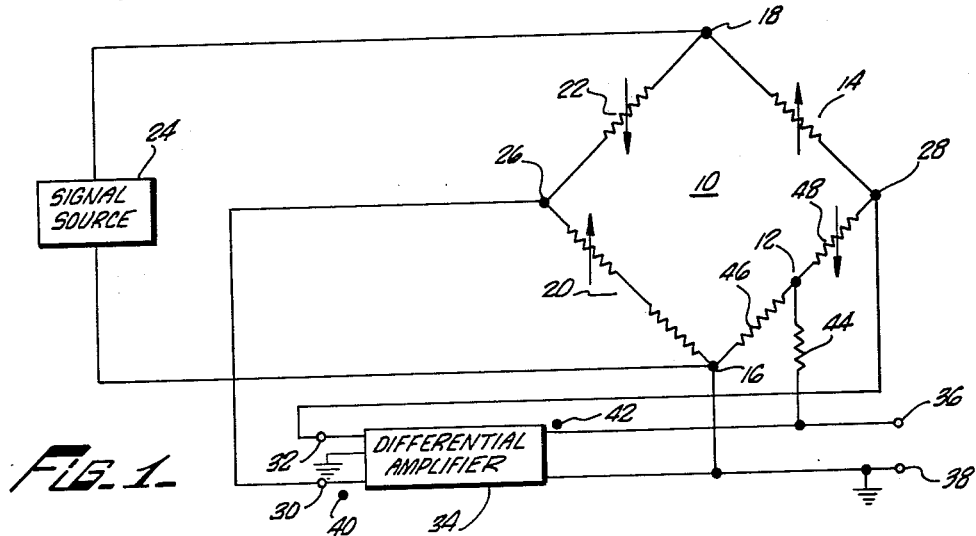
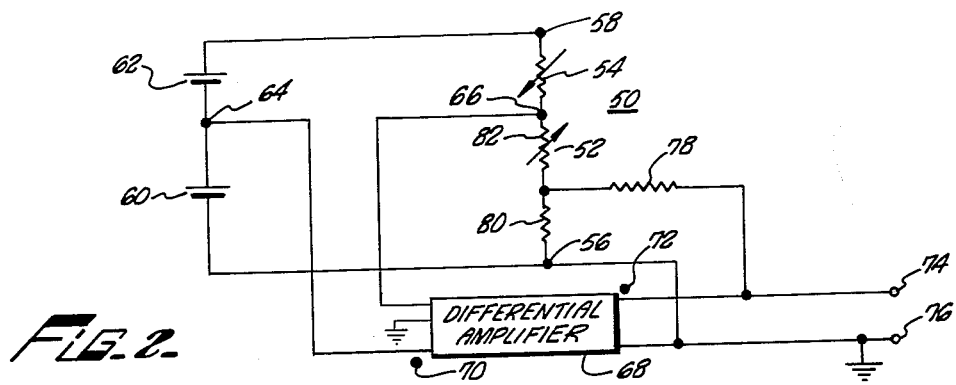
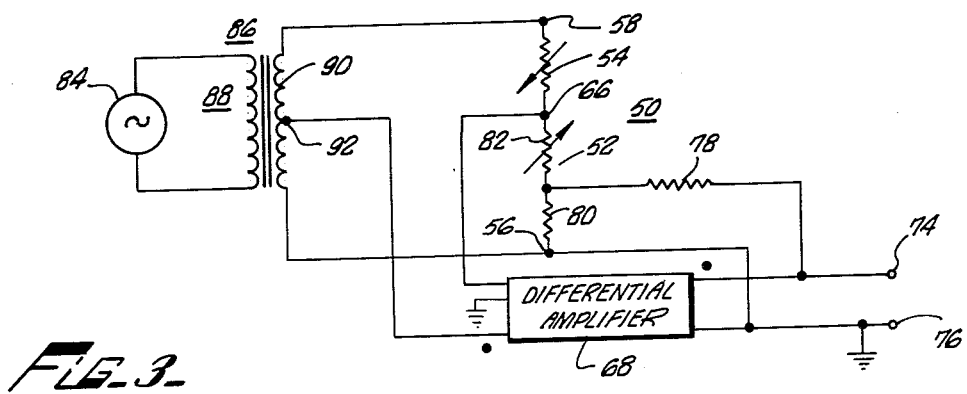
INVENTORS.
NORTON W. BELL
RICHARD H. SMALL
ARTHUR R. SOFFEL
BY
Christie, Parker & Hale
ATTORNEYS.

Sept. 8, 1964    N. W. BELL ETAL    3,148,339
NEGATIVE FEEDBACK AMPLIFIER FOR BRIDGE-TYPE TRANSDUCERS
Filed April 7, 1961    2 Sheets-Sheet 2

INVENTORS.
NORTON W. BELL
RICHARD H. SMALL
ARTHUR R. SOFFEL
BY
Christie, Parker & Hale
ATTORNEYS.

United States Patent Office 3,148,339
Patented Sept. 8, 1964

3,148,339
NEGATIVE FEEDBACK AMPLIFIER FOR BRIDGE-TYPE TRANSDUCERS
Norton W. Bell, Monrovia, Richard H. Small, Los Angeles, and Arthur R. Soffel, Whittier, Calif., assignors to Consolidated Electrodynamics Corporation, Pasadena, Calif., a corporation of California
Filed Apr. 7, 1961, Ser. No. 101,495
13 Claims. (Cl. 330—69)

This invention relates to low-level signal amplifying configurations, and, more particularly, to an amplifier configuration employing negative feedback for use with bridge-type transducers.

In many commercial and military systems it is desired to monitor conditions at certain points in the system. For example, it may be desired to measure the pressure or temperature at particular points in the system, or to measure the stresses or strains placed upon particular objects or materials during processing. To provide such measurement it is generally the practice to place a transducer arrangement in proximity to the object or point being monitored which is sensitive to changes in the condition being measured. Changes in the condition being measured are reflected as changes in the transducer arrangement. Generally, these changes appear as changes in transducer impedance which, in turn, produce changes in the magnitude of a voltage signal developed by the transducer arrangement.

Since monitoring accuracy is generally of prime importance, it is preferred that changes in the output signal produced by the transducer arrangement accurately reflect the smallest of changes in the condition being measured. Accordingly, it is desired that a given change in monitored condition result in a maximum change in the output signal developed by the transducer arrangement. To accomplish this, transducer arrangements are utilized which include variable impedance elements arranged to vary in opposite sense in response to a given change in the monitor condition. Such transducer arrangements produce a maximum variation in impedance for a given change in the monitored condition, and thus produce a maximum change in output signal. A preferred form of such a transducer arrangement is a bridge-type transducer configuration.

In bridge-type transducer configurations, opposite branches of the bridge are generally constructed as to vary in a like sense, adjacent branches being varied in an opposite sense. Accordingly, for a given change in condition, opposite pairs of branches of the transducer bridge will vary in opposite sense thereby producing a maximum output signal from the transducer configuration.

Generally, however, even when a bridge-type transducer is employed, the changes in output signal produced thereby in response to changes in the monitored condition are quite small. Accordingly, it is usually necessary to provide means for amplifying the output signals developed by the transducer arrangement. Due to the accuracy required in measuring the conditions being monitored, it is desired that the output of such an amplifier be responsive only to changes in the output signal developed by the transducer configuration to provide an output signal which is directly a function of the changes in conditions being monitored. Thus, aging of the components of the amplifier, noise, and hum should not be allowed to affect the output signal developed by the amplifier. To prevent such action it is desirable that a negative feedback path be included between the amplifier output and input terminals.

In attempting to provide such negative feedback with bridge-type transducer configurations two problems are encountered. First, a direct feedback connection between the output of the amplifier and its input would include a connection to a point of the bridge-type transducer having a potential which is generally greater than the potential developed at the output of the amplifier. Under such conditions, negative feedback is not possible. Secondly, if an extremely high-gain amplifier is utilized which would overcome the above-mentioned voltage difference, a connection between the output terminals of the amplifier and its input terminals would provide an impedance path which changes the normal impedance balance of the bridge. In addition, any feedback arrangement should permit one terminal of the exciting source for the bridge and one output terminal of the amplifier to be at ground reference potential. This is desirable to avoid the need for a floating power supply and to permit a common supply for a number of bridge-type monitoring circuits. Likewise, the output should be grounded to simplify coupling into the output load device.

In view of the above, the present invention provides a novel amplifier configuration in combination with a bridge-type transducer which employs negative feedback between the output of the amplifier and its input terminals. To accomplish this, the present invention, in a basic form, provides a negative feedback path which includes a common connection to a source of reference potential and between a corner of the bridge which is coupled to the bridge's source of excitation and one of the output terminals of the amplifier, and a feedback connection between the other of the amplifier output terminals and a branch of the transducer bridge adjoining the common corner of the bridge. In particular, the feedback connection is such as to provide means for applying a portion of the output signal developed by the amplifier across a small portion of the branch of the bridge directly adjoining the common corner of the bridge, the portion of the output signal being of a polarity which produces a negative feedback voltage at the input of the amplifier. Due to such a connection of the output terminals of the amplifier across a small portion of a branch of the bridge adjoining the common corner, the output impedance of the amplifier and the impedance of the feedback connection into the bridge results in only a negligible impedance change in one branch of the bridge, so that the balance condition of the bridge is not affected by the addition of the feedback circuit. This is important from the standpoint of circuit design since the feedback connection does not introduce a further parameter into the bridge design.

The above as well as other features of the present invention may be more clearly understood by reference to the following detailed description when considered with the drawings, in which:

FIGURE 1 is a diagrammatic representation of the amplifier configuration of the present invention in combination with a bridge-type transducer arrangement;

FIGURE 2 is a diagrammatic representation of the amplifier configuration of the present invention in combination with a voltage-divider type transducer arrangement;

FIGURE 3 is a diagrammatic representation of the amplifier configuration of the present invention in combination with a voltage-divider type transducer arrangement being excited from an alternating current source;

Figure 4:
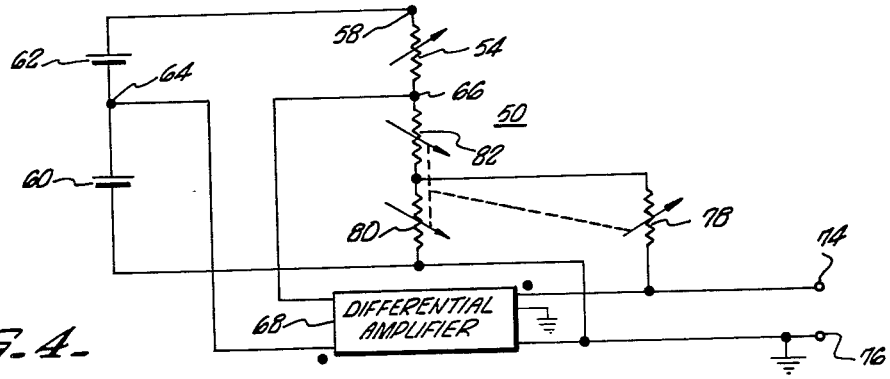
FIGURE 4 is a diagrammatic representation of a preferred form of the amplifier configuration of the present invention in combination with a voltage-divider type transducer arrangement.

Referring to FIGURE 1, there is shown an amplifier configuration of the present invention in combination with a bridge-type transducer arrangement 10. As illustrated, the bridge-type transducer 10 includes branches 12 and 14 connected in series between terminals 16 and 18. In addition, the bridge 10 includes branches 20 and 22, also connected in series between the terminals 16 and 18. The bridge 10 is normally balanced in that the impedance branches 12 and 14 have an impedance ratio which is normally equal to an impedance ratio of the branches 20 and 22. Accordingly, a potential applied between the terminals 16 and 18 from the excitation source represented at 24 normally produces a zero voltage between terminals 26 and 28 of the bridge configuration 10.

As illustrated in FIGURE 1, the opposite branches of the bridge-type transducer 10 are variable in a like sense while adjacent branches are variable in an opposite sense. Thus, when the condition being monitored by the transducer arrangement varies, the variable bridge elements in the branches 14 and 20 vary in the same sense while the variable bridge elements in the bridge arms 12 and 22 vary in an opposite sense. In this manner, a given variation in the condition being monitored produces a maximum variation in the impedance of the transducer arrangement which causes a substantial unbalancing of the bridge.

The unbalancing of the bridge, in turn, results in a voltage signal being developed between input terminals 30 and 32 of an amplifier 34, which terminals, as illustrated in FIGURE 1, are connected to the terminals 26 and 28 of the bridge 10. The amplifier 34 is of a type whose output is responsive only to the difference between the two potentials applied to its two input terminals. Such an amplifier may be termed a difference-type or differential amplifier. Thus, the voltage signal developed between the input terminals 30 and 32 of the differential amplifier 34, in turn, produces an output signal between output terminals 36 and 38 which varies only as a function of the voltage signal produced between the bridge terminals 26 and 28. In particular, as represented by the dot notation at 40 and 42, the differential amplifier 34 is so arranged that the output signal developed between the terminals 36 and 38 is of opposite polarity to the voltage between the input terminals 32 and 30. Thus, when the input terminal 30 is positive relative to the input terminal 32, the output terminal 36 is positive relative to the output terminal 38.

As previously mentioned, due to the requirement of linear response placed upon the transducer amplifier configuration such as that so far described, it is desired that a negative feedback path be included between the output and the input terminals of the amplifier. In providing this feedback path, however, it is necessary that the initial impedance balance of the transducer arrangement not be affected by the impedance of the feedback path as would occur if a feedback path were directly connected between the output terminal 36 of the amplifier 34, and the input terminal 32. As previously mentioned, the present invention contemplates an amplifier configuration including a negative feedback path which does not affect the initial impedance balance of the transducer arrangement. In particular, as illustrated in FIGURE 1, to provide such a negative feedback path the output terminal 38, being coupled to ground, is connected to the terminal 16 of the bridge-type transducer arrangement 10. Further, a resistor 44 is connected between the output terminal 36 and the branch 12 of the balanced bridge 10. In particular, as shown in FIGURE 1, the branch 12 of the balanced bridge 10 includes first and second impedance elements represented at 46 and 48, respectively. In accordance with the present invention, the impedance element represented at 46 has an impedance magnitude which is substantially less than the impedance of the element 48. Thus the series connection of the output impedance of the amplifier and the resistance element 44 is in parallel with the relatively small impedance element 46. The initial impedance of such a feedback connection produces only a negligible change in the over-all impedance of the branch 12 and hence does not affect the initial impedance balance of the bridge circuit 10.

However, with a change in the condition being monitored by the bridge 10, the impedance balance of the bridge is materially modified and a voltage is developed between the output terminals 26 and 28 of the bridge. The output voltage from the bridge, in turn, produces an output voltage between the output terminals 36 and 38 of the amplifier 34. A portion of the amplifier output voltage forms a negative feedback voltage. The magnitude of the feedback voltage is a function of the input voltage to the amplifier produced by the unbalance of the bridge (caused by a change in the condition being monitored), the gain of the amplifier 34, and the value of the resistor 44 relative to the impedance element 46. The feedback voltage developed across the element 46 generally comprises a small portion of the output voltage developed between the output terminals 36 and 38 because the element 46 is small compared to the resistors 44. However, because of the high gain of the amplifier 34, the feedback voltage functions to materially reduce the voltage signal between the input terminals 30 and 32 of the amplifier 34 in the manner of conventional negative feedback techniques.

Due to the feedback connection of the amplifier 34 and the bridge-type transducer 10, an output signal is produced which is a direct function of the variations in the voltage developed by the bridge and is responsive to rapid changes in the conditions being monitored.

Further, it should be noted that the particular common connection between the source of excitation 24, the terminal 16, and the output terminal 38, prevents impedance variations in other bridge-type transducers which may be connected in parallel with the bridge 10 from affecting the output of the amplifier 34. In particular, but for the common connection, a variation in the impedance of one of the parallel bridge transducers would result in a change in the voltage applied to the bridge 10 from the source 24. This would produce a change in the voltage developed by the bridge 10 which would be indistinguishable from a variation in the condition being monitored, thereby producing measurement inaccuracies.

Referring to FIGURE 2 there is illustrated a form of the present invention with a voltage divider-type transducer arrangement. As represented, a voltage divider-type transducer is a form of transducer arrangement in which impedance branches thereof are arranged to vary in an opposite sense in response to a given change in the condition being monitored. Thus, like the bridge-type transducer of FIGURE 1, a given change in the condition being monitored results in a maximum change in the impedance of the transducer arrangement.

In particular, as shown, the voltage divider 50 includes two branches 52 and 54 connected in series between terminals 56 and 58. Also connected between the terminals 56 and 58 are sources of first and second potential represented as series connected batteries 60 and 62. In accordance with the form of the present invention illustrated in FIGURE 2, the first and second sources of potential have a voltage ratio which is equal to the normal impedance ratio of the branches 52 and 54. Accordingly, zero voltage is developed between a junction 64 of the batteries 60 and 62 and a junction 66 of the branches 52 and 54.

As is further represented in FIGURE 2, the branches 52 and 54 each include variable impedance elements. Accordingly, with a change in the conditions being monitored by the transducer arrangement, the branch 52 will vary in a first sense while the impedance of the branch 54 will vary in an opposite sense. Thus, a voltage difference will be developed between the junctions 64 and 66. To amplify this voltage difference, a differential amplifier, illustrated at 68, is connected between the junctions 64 and 66. As represented by the dot notation illustrated at 70 and 72, the differential amplifier 68 develops an output signal between output terminals 74 and 76 which is of opposite polarity to the signal developed between the junctions 66 and 64. Accordingly, when the junction 64 is positive relative to the junction 66, the output terminal 74 is positive relative to the output terminal 76.

From the above description, a direct similarity between the voltage divider-type transducer and the bridge-type transducer described in connection with FIGURE 1, is to be noted. In particular, the voltage divider transducer represents a preferred form of bridge transducer wherein two series branches of the bridge have a zero impedance.

Although the number of impedance branches present in a voltage divider transducer represents a reduction in elements over the bridge transducer, the problems associated with providing a negative feedback path between amplifier output and input terminals remains. For example, connecting a feedback element directly between the output terminal 74 and the junction 66 would allow the output impedance of the amplifier 68 and the impedance of the feedback connection to affect the impedance balance of the voltage divider transducer arrangement. Thus, in accordance with the present invention, a feedback arrangement similar to that described in connection with FIGURE 1, may be included to provide the desired negative feedback.

In particular, to provide means for developing the desired negative feedback between the output and input terminals of the differential amplifier 68 illustrated in FIGURE 2, the output terminal 76 being connected to ground is also connected to the terminal 56. Further, the output terminal 74 is coupled by a resistance element 78 to branch 52. As represented in FIGURE 2, the branch 52 includes first and second impedance elements represented at 80 and 82. In particular, the impedance element 80 has an impedance magnitude which is substantially less than the impedance of the element 82. Accordingly, the resistance element 78 being connected to a junction of the impedance elements 80 and 82 is connected to a point which is slightly above ground potential.

Thus, a portion of the output signal developed by the amplifier 68 is applied across a low impedance element of the voltage divider arrangement 50, one terminal of the low impedance element being in common with a terminal of the battery 60, and one output terminal of the amplifier 68. Due to the magnitude of this impedance element relative to the impedance of the branch of which it is a part, the addition of the element 80 will have a negligible effect upon the normal impedance balance of the transducer arrangement represented in FIGURE 2. Further, by simple circuit analsyis, it may be shown that due to the polarity of the portion of the output signal applied across the low impedance element, a negative feedback voltage is developed across the input of the amplifier 68.

Accordingly, the amplifier configuration of the present invention, with a voltage divider-type transducer arrangement, produces an output signal which is a direct function of variations in the voltage developed by the transducer arrangement, and is responsive to rapid changes in the conditions being monitored.

Further, as previously described in connection with FIGURE 1, it should be noted that the particular common connection between battery 60, the terminal 56, and the output terminal 76, prevents impedance variations in other voltage divider-type transducer which may be connected in parallel with the transducer arrangement 50 from affecting the output of the amplifier 68.

Referring to FIGURE 3, there is shown an amplifier configuration of the present invention in combination with a voltage divider-type transducer arrangement. As illustrated, the configuration of FIGURE 3 is substantially the same as that depicted by FIGURE 2. Accordingly, only the differences therebetween will be discussed. As shown in FIGURE 3, the signal source includes a source of alternating signals 84 which is coupled to a transformer represented at 86. As shown, the transformer 86 includes a primary winding 88 connected to the source 84 and a secondary winding 90 coupled between the terminals 56 and 58. As represented in FIGURE 3, the secondary winding 90 includes a tap 92 which may be positioned along the secondary winding 90. In particular, the tap is so positioned that a voltage ratio is developed between the terminals 56 and 58 and the tap 92 which is equal to the normal impedance ratio of the branches 52 and 54 of the voltage divider transducer arrangement. Accordingly, a zero voltage is normally developed between the tap 92 and the junction 66 when the variable elements of the branches 52 and 54 are in a normal condition.

As described in connection with FIGURE 2, when the conditions being monitored by the transducer arrangement change, a voltage signal is developed between the junction 66 and the tap 92. Accordingly, by connecting the tap 92 and the junction 66 to the input of the differential amplifier 68, an output signal is developed between the output terminals 74 and 76, which, due to the negative feedback path of the present invention, is responsive to rapid changes in the unbalance of the voltage divider 50, and varies as a substantial function of the changes in the condition being monitored.

As discussed in connection with FIGURES 1 through 3, due to the particular negative feedback path of the present invention, the output signal developed by the amplifier configuration is substantially linear with changes in input voltage. However, since in each case the negative feedback path includes varying elements, a slight non-linearity is produced in the output signal with changes in the variable impedance elements of the associated transducer arrangement.

In particular, in feedback amplifier configurations where the overall loop gain is large, the gain of the amplifier configuration may be represented by the following expression:

$$G = \frac{1}{B} \quad (1)$$

where B is the feedback factor defined as being equal to a ratio of the feedback voltage to the amplifier output voltage. Thus, if the feedback factor should change due to variation in the variable impedance elements of the transducer arrangement, the gain of the amplifier configuration changes resulting in an output signal which is slightly non-linear with changes in the monitored condition.

That such a non-linearity results may be understood from the following general analysis of the configuration represented in FIGURE 2. In the configuration represented in FIGURE 2, the negative feedback path includes the resistor element 78 in series with a parallel circuit including the impedance element 80 in parallel with a series path comprising the impedance element 82 and the impedance branch 54. In this configuration the feedback voltage is developed across the impedance element of the branch 54. For simplicity of analysis, the value of each of the above elements will be represented by R having a subscript denoting the particular element. Accordingly, for example, the resistor element 78 will be represented as $R_{78}$. To further simplify the analysis, it will be assumed that the normal value of the impedance elements 82 and the branch 54 are of equal magnitude; further, that the value of the resistor element 78 and the impedance element 80 are of equal magnitude. Since, as previously mentioned, the magnitude of the impedance element 80 is substantially less than the value of the impedance element 82, the feedback factor for a particular feedback path reduces to the following:

$$B_{\pm} = \frac{R_{80}}{2R_{80}} \cdot \frac{R_{54} \pm \Delta R_{54}}{R_{54} \pm \Delta R_{54} + R_{54} \mp \Delta R_{54}} = \frac{1 \pm \Delta}{4} \quad (2)$$

where $\Delta$ represents the fractional change in the impedance of each of the variable impedance elements, the variation in sign being due to the opposite sense of variation of the impedance elements 82 and 54.

Accordingly, the gain of the amplifier may be expressed as:

$$G_{\pm} = \frac{4}{1 \pm \Delta} \quad (3)$$

From the latter expression it is seen that the gain of the amplifier configuration varies with $\Delta$ and is different for opposite changes in the conditions being monitored by the transducer arrangement. Thus, due to the non-linearity of the gain of the transducer amplifier configuration, an error results. Since when $\Delta = 0$ the gain is equal to four, the error may be represented as:

$$E_{\pm} = 4 - G_{\pm} = \frac{\pm \Delta}{1 \pm \Delta} \quad (4)$$

Figure 5:
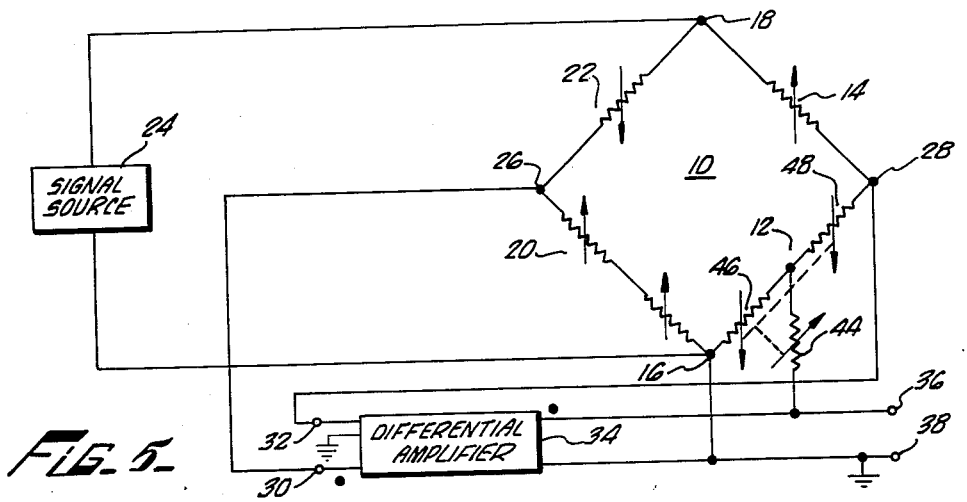
FIGURE 5 is a diagrammatic representation of a preferred form of the amplifier configuration of the present invention in combination with a bridge-type transducer arrangement.
Figure 6:
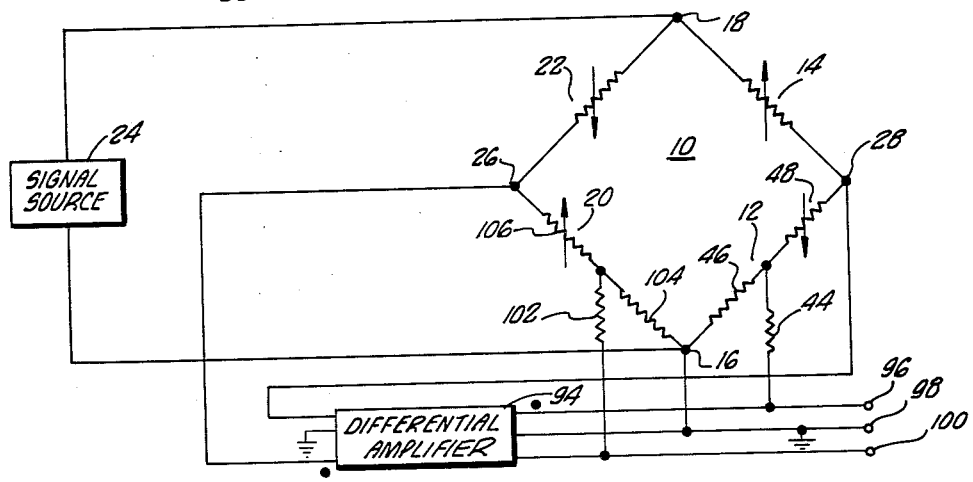
FIGURE 6 is a diagrammatic representation of a preferred form of amplifier configuration having a balanced output in combination with a bridge-type transducer arrangement.

Although the above-calculated error may be very small depending upon the amount by which each of the variable impedance elements changes with changes in the conditions being monitored, some measurement systems require extremely high accuracy. For such situations, the improvements shown in FIGURES 4, 5, and 6 represent preferred forms of the present invention wherein the non-linearity produced by variations in the variable impedance elements included in the feedback path of the amplifier configuration are substantially overcome.

Referring to FIGURE 4, there is illustrated a preferred embodiment of the present invention in combination with a voltage divider-type transducer arrangement such as illustrated in FIGURE 2. As shown, the improvement consists in making the resistance element 78 and the impedance element 80 variable in an opposite sense in response to a given change in the condition being monitored. That this configuration results in a substantially linear output signal developed by the transducer amplifier 68 may be seen from the following circuit analysis.

Considering the same feedback path as described previously, the feedback factor of the preferred form of the present invention may be represented by the expression:

$$B'_{\pm} = \frac{R_{80} \pm \Delta R_{80}}{R_{80} \pm \Delta R_{80} + R_{80} \mp \Delta R_{80}} \cdot \frac{R_{54} \pm \Delta R_{54}}{R_{54} \mp \Delta R_{54} + R_{54} \pm \Delta R_{54}} \quad (5)$$

which reduces to:

$$B_{\pm} = \frac{1 \mp \Delta}{2} \cdot \frac{1 \pm \Delta}{2} = \frac{1 - \Delta^2}{4} \quad (6)$$

Accordingly, the gain of the amplifier configuration represented reduces to:

$$G'_{\pm} = \frac{4}{1 - \Delta^2} \quad (7)$$

Thus, the gain of the amplifier configuration varies in a single sense with changes in the variable impedance elements of the transducer arrangement. This results in an error which is represented by the expression:

$$E'_{\pm} = 4 - \frac{4}{1 - \Delta^2} = \frac{-4\Delta^2}{1 - \Delta^2} \quad (8)$$

The reduction in the error developed by the preferred form of the present invention represented in FIGURE 4 over that represented in FIGURE 2 may be represented by:

$$\frac{E'}{E} = \frac{-4\Delta^2}{1 - \Delta^2} \cdot \frac{1 \pm \Delta}{\pm \Delta} = \frac{4\Delta}{1 \pm \Delta} \quad (9)$$

which, since $\Delta$ is always very small, Equation 9 reduces to $4\Delta$. Accordingly, the error is reduced by a very large factor if $\Delta$ is small.

The above analysis for the reduction in the output non-linearity is likewise applicable to bridge-type transducers. Accordingly, a preferred embodiment of the present invention, including a bridge-type transducer, is represented in FIGURE 5. As illustrated, the resistor 44 is variable in a first sense in response to a given change in the monitored condition, while the impedance element 46 is variable in opposite sense. By a direct application of the analysis associated with FIGURE 4, it may be shown that the gain of the configuration of FIGURE 5 may be represented by the Equation 7. Thus, the non-linearity in output signal caused by a variation in the variable impedance elements of the bridge 10 is reduced to second order effects.

Referring to FIGURE 6, there is represented another preferred form of the present invention for producing a substantially linear output signal irrespective of changes in the variable impedance elements of a bridge-type transducer. A shown, the preferred form of amplifier configuration includes, in combination with a bridge-type transducer arrangement, a differential amplifier 94 having a balanced output. In particular, the differential amplifier 94 includes a three-terminal output represented by terminals 96, 98, and 100. As shown, the terminal 98 is connected to ground. Thus, as represented by the dot notation adjacent to the amplifier 94, when the junction 26 is positive relative to the junction 28, due to a given bridge unbalance, the output terminal 96 is positive relative to ground at the output terminal 98, while the output terminal 100 is negative relative to ground.

As illustrated in FIGURE 6, the improvement represented by this form of the invention includes two negative feedback paths coupled between output terminals of the differential amplifier 94 and the bridge-type transducer 10. In particular, these feedback paths are so connected as to have an additive effect; thus, each feedback path contributes a non-linearity equal to that of the single path circuit represented in FIGURE 1, but in an opposite sense. Accordingly, the result is a constant feedback ratio and thus a linear input-output relationship for the transducer amplifier 94.

To provide this desired feedback arrangement, the output terminal 98 being connected to ground is also connected to the terminal 16 of the bridge-type transducer arrangement 10. To provide one feedback path, the resistor 44 is connected between the output terminal 96 and a junction of the impedance elements 46 and 48. To provide the other feedback path, a resistor 102 is coupled between the output terminal 100 and the branch 20. In particular, as illustrated in FIGURE 6, the branch 20 includes first and second impedance elements represented at 104 and 106. In accordance with the present invention, the impedance element 104 has a magnitude which is substantially less than impedance element 106. In particular, in one form of the invention the impedance elements 104 and 102 are normally equal to the impedance elements represented at 46 and 44. Accordingly, when the resistance of resistor 44 equals the resistance of resistor 102, the equal feedback signals are developed across the impedance elements 46 and 104 having nonlinearities that are equal but of opposite sense and which cancel to produce a resultant gain for the amplifier configuration which is substantially linear with variations in the impedance elements of the bridge-type transducer.

That a substantially linear output which changes in conditions being monitored results from the configuration represented in FIGURE 6 may be understood from the following analysis.

It can be shown by circuit analysis that the feedback path including the impedance element 46 and the resistor 44 may be reduced for a consideration of the non-linearities produced by variations in the variable impedance elements of the bridge 10 to that previously discussed in connection with FIGURE 2. Accordingly, the feedback factor for this portion of the feedback may be represented by Equation 2.

By a like circuit analysis, it can be shown that the non-linearity produced in the feedback derived from the portion of the circuit including the impedance elements 104 and 106 and the resistor 102 may be reduced to a circuit including the resistor 102 in series with a parallel circuit configuration consisting of the impedance element 104 in parallel with a series circuit comprising a variable impedance element 106 and the variable impedance element of the branch 22. In this circuit configuration, the feedback voltage is developed across the variable impedance element of the branch 22. In accordance with this analysis and wherein the value of the impedance element 104 is substantially less than the value of the impedance element 106 and wherein the resistor element 102 equals the impedance element 104, the feedback factor for this circuit reduces to the following:

$$B'_{\pm} = \frac{1 \mp \Delta}{4} \quad (10)$$

In this case the variation in the sign $\pm$ between the Equations 2 and 10 is due to the opposite sense in which the impedance elements 106 and 22 vary relative to the impedance elements 48 and 14.

Since the total feedback factor is the sum of the individual contributions, the total feedback factor reduces to:

$$B_T = B + B' = \frac{1}{2} \quad (11)$$

Accordingly, the total feedback factor for the configuration represented in FIGURE 6 is completely independent of the unbalance of the bridge-type transducer 10. Further, as previously mentioned, when the overall gain of the loop is large, the gain is substantially equal to the reciprocal of the feedback factor. Accordingly, a substantially linear gain is produced by the differential amplifier 94 in response to the two feedback signals derived from its output.

What is claimed is:

1. A transducer amplifier configuration comprising: a voltage divider including first and second impedance branches connected in series between first and second terminals, said first impedance branch including first and second impedance elements connected in series, said first impedance element having a magitude which is substantially less than said second impedance element and being coupled to said first terminal, said second impedance element being coupled to a junction between said first and second impedance branches, and at least one of said impedance branches including a variable impedance element; a source of first potential and a source of second potential connected in series between said first and second terminals, said first and second potentials having a voltage ratio which is normally equal to the impedance ratio of said first and second impedance branches; an amplifier having input and output terminals; means for connecting said input terminals between a junction of the sources of first and second potential and a junction of the first and second impedance branches such that a voltage is developed across said input terminals when the voltage ratio-impedance ratio equality is modified by variation of said variable impedance element and such that an output signal is developed between said output terminals which is a direct function of the variation of said variable impedance element; and means for applying a portion of said output signal across said first impedance element to develop a negative feedback voltage between the input terminals of said amplifier.

2. A transducer amplifier configuration comprising: a voltage divider including first and second impedance branches connected in series between first and second terminals, said first impedance branch including first and second impedance elements connected in series, said first impedance element having a magnitude which is substantially less than said second impedance element and being coupled to said first terminal, said second impedance element being connected to a junction between said first and second impedance branches, and at least one of said impedance branches including a variable impedance element; a source of first potential and a source of second potential connected in series between said first and second terminals, said first and second potentials having a voltage ratio which is normally equal to an impedance ratio of said first and second impedance branches; an amplifier having input and output terminals; means for connecting said input terminals between a junction of the sources of first and second potential and the junction of the first and second impedance branches such that a voltage is developed across said input terminals when the voltage ratio-impedance ratio equality is modified by variation of said variable impedance element and such that an output signal is developed between said output terminals which is a direct function of said variation of said variable impedance element; means for connecting a first one of said output terminals to said first terminal; and negative feedback means coupled between a second one of the output terminals and a junction of said first and second impedance elements.

3. A transducer amplifier configuration as defined in claim 2 wherein said feedback means includes a resistance element.

4. In a transducer amplifier configuration comprising a voltage divider including two impedance branches coupled between first and second terminals, said impedance branches including at least one variable impedance element, a source of first potential and a source of second potential connected in series between said first and second terminals, said first and second potentials having a voltage ratio which is normally equal to an impedance ratio of said two impedance branches, an amplifier having input and output terminals, said input terminals being connected between a junction of the sources of first and second potential and a junction of the two impedance branches such that a voltage is deveoloped across said input terminals when the voltage ratio-impedance ratio equality is modified by variation of a variable impedance element and such that an output signal is developed between said output terminals which is a direct function of the variation of the variable impedance element; means for applying a portion of the output signal developed between said output terminals across a portion of one of said impedance branches adjoining one of said first and second terminals to develop a negative feedback voltage between the input terminals of said amplifier, said portion of the one impedance branch having an impedance which is substantially less than the impedance of the one impedance branch.

5. In a transducer amplifier configuration comprising a voltage divider including two impedance branches coupled between first and second terminals, a source of first potential and a source of second potential connected in series between said first and second terminals, said first and second potentials having a voltage ratio which is normally equal to an impedance ratio of said two impedance branches, an amplifier having input and output terminals, said input terminals connected between a junction of the sources of first and second potential and a junction of the two impedance branches: means for coupling a first one of said output terminals to one terminal of said first and second terminals; and negative feedback means coupled between a second one of said output terminals and the impedance branch adjoining said one terminal to divide the impedance branch into two portions, the portion adjoining said one terminal having an impedance which is substantially less than the other portion of the impedance branch.

6. The configuration defined in claim 5 wherein said negative feedback means includes a resistance element.

7. A transducer amplifier configuration comprising: a voltage divider including first and second impedance branches connected in series between first and second terminals; said first impedance branch including first and second impedance elements connected in series, said first impedance element having an impedance magnitude which is substantially less than said second impedance element and being coupled to said first terminal, said second impedance element being connected to a junction between said first and second impedance branches, and said impedance branches including a variable impedance element; a signal source coupled between said first and second terminals; means including a tap terminal dividing said signal source into a source of first potential and a source of second potential connected in series, said first and second potentials having a voltage ratio which is normally equal to an impedance ratio of said first and second impedance branches such that a zero potential is normally developed between the tap terminal and a junction of said first and second impedance branches; a differential amplifier having input and output terminals; means for connecting said input terminals between said tap terminal and said junction of said first and second impedance branches such that said differential amplifier produces an output signal which is a direct function of variations in the variable impedance element; means including a first one of said output terminals for connecting said first terminal to a source of reference potential; and resistance means coupled between a second one of said output terminals and a junction of said first and second impedance elements for applying a portion of the output signal across said first impedance element to produce a negative feedback voltage across said input terminals of said differential amplifier.

8. A transducer amplifier configuration comprising: a first voltage divider including first and second impedance branches connected in series between first and second terminals; said first impedance branch including first and second impedance elements connected in series; said first impedance element having a magnitude which is substantially less than said second impedance element and being coupled to said first terminal, said second impedance element being connected to a junction between said first and second impedance branches; a signal source coupled between said first and second terminals; a second voltage divider including third and fourth impedance branches connected in series between said first and second terminals; said third and fourth impedance branches having an impedance ratio which is normally equal to an impedance ratio of said first and second impedance branches, said impedance branches including at least one variable impedance element; an amplifier having input and output terminals; means for connecting said input terminals between a junction of said first and second impedance branches and a junction of said third and fourth impedance branches such that a voltage difference is developed between said input terminals when the impedance ratio equality is modified by variation of said variable impedance element and such that an output signal is developed between said output terminals which is a direct function of the variation of said variable impedance element; means including a first one of said output terminals for connecting said first terminal to ground; and means including a resistance element coupled between a second one of said output terminals and a junction of said first and second impedance elements for applying a portion of the output signal across said first impedance element to develop a negative feedback voltage between the input terminals of said amplifier.

9. A transducer amplifier configuration comprising: a normally balanced impedance bridge including first and second branches connected in series between first and second terminals and third and fourth impedance branches connected in series between said first and second terminals; said first impedance branch including first and second impedance elements connected in series; said first impedance element having a magnitude which is substantially less than said second impedance element and being coupled to said first terminal, said second impedance element being connected to a junction between said first and second impedance branches, said impedance branches including at least one variable impedance element; a signal source connected between said first and second terminals; an amplifier having input and output terminals; means for coupling said input terminals between a junction of said first and second impedance branches and a junction of said third and fourth impedance branches; means including a first one of said output terminals for coupling said first terminal to a source of reference potential; and negative feedback means including a resistor coupled between a second one of said output terminals and a junction of said first and second impedance elements.

10. A transducer amplifier configuration comprising: a normally balanced bridge including first and second impedance branches coupled in series between first and second terminals, third and fourth impedance branches coupled in series between said first and second terminals; said first branch including first and second impedance elements connected in series; said first impedance element having an impedance magnitude which is substantially less than said second impedance element and being coupled to said first terminal, said second impedance element being connected to a junction between said first and second impedance branches, said third impedance branch including third and fourth impedance elements, said third impedance element having a magnitude which is substantially less than said fourth impedance element and being coupled to said first terminal, said fourth impedance element being connected to a junction between said third and fourth impedance branches, and said impedance branches including at least one variable impedance element; an amplifier having a pair of input terminals and a balanced output including three output terminals; means for coupling said input terminals between a junction of said first and second impedance branches and a junction of said third and fourth impedance branches; means for coupling a first one of said output terminals to a source of reference potential; a first negative feedback means including a resistor connected between a second one of said output terminals and a junction of said first and second impedance elements; and a second negative feedback means including a resistor connected between a third one of said output terminals and a junction of said third and fourth impedance elements.

11. A transducer amplifier configuration comprising: a voltage divider including first and second impedance branches connected in series between first and second terminals, said first impedance branch including first and second impedance elements connected in series, said first impedance element being variable in a first sense and having a magnitude which is substantially less than said second impedance element, said first impedance element being coupled to said first terminal, said second impedance element being connected to a junction between said first and second impedance branches, and said impedance branches including at least one variable impedance element; a source of first potential and a source of second potential connected in series between said first and second terminals, said first and second potentials having a voltage ratio which is normally equal to an impedance ratio of said first and second impedance branches; an amplifier having input and output terminals; means for connecting the input terminals between a junction of said sources of first and second potential and a junction of said first and second impedance branches; means including a one of said output terminals for connecting said first terminal to a source of reference potential; and negative feedback means including a resistor connected between a second one of said output terminals and a junction of said first and second impedance elements, said resistor being variable in a sense opposite to said first impedance element.

12. A transducer amplifier configuration comprising: a normally-balanced impedance bridge including first and second branches connected in series between first and second terminals and third and fourth impedance branches connected in series between said first and second terminals, said first impedance branch including first and second impedance elements connected in series, said first impedance element being variable in a first sense and having a magnitude which is substantially less than said second impedance element, said first impedance element being coupled to said first terminal, said second impedance element being connected to a junction between said first and second impedance branches, and said impedance branches including at least one variable element; a signal source connected between said first and second terminals; an amplifier having input and output terminals; means for coupling said input terminals between a junction of said first and second impedance branches and a junction of said third and fourth impedance branches; means for coupling a first one of said output terminals to said first terminal; and negative feedback means including a resistor connected between a second one of said output terminals and a junction of said first and second impedance elements, said resistor being variable in a sense opposite to said first impedance element.

13. Apparatus comprising a bridge circuit including four impedance legs at least one of which is variable, a voltage excitation source connected across one diagonal of the bridge circuit, an amplifier having a double-ended input and a pair of output terminals, one of which is grounded, means connecting the double-ended input across the other diagonal of the bridge and means connecting the ungrounded output terminal of the amplifier to a tap on one of the impedance legs of the bridge circuit, said one impedance leg having a common connection with the grounded terminal of the amplifier output.

No references cited.